United States Patent [19]

Henderson

[11] 4,294,942

[45] Oct. 13, 1981

[54] RUBBERY COPOLYMERS OF 2,3-DIMETHYL 1,3-BUTADIENE

[75] Inventor: James N. Henderson, Hudson, Ohio

[73] Assignee: The Goodyear Tire & Rubber Company, Akron, Ohio

[21] Appl. No.: 121,626

[22] Filed: Feb. 14, 1980

Related U.S. Application Data

[63] Continuation of Ser. No. 3,835, Jan. 16, 1979, abandoned, which is a continuation of Ser. No. 915,682, Jun. 14, 1978, abandoned, which is a continuation of Ser. No. 825,318, Aug. 17, 1977, abandoned, which is a continuation of Ser. No. 775,125, Mar. 7, 1977, abandoned.

[51] Int. Cl.³ ............................................. C08F 297/02
[52] U.S. Cl. ...................................... 525/314; 526/337
[58] Field of Search ......................... 525/314; 526/337

[56] References Cited

U.S. PATENT DOCUMENTS 3,607,982  9/1971  Winkler ............................ 260/879

Primary Examiner—Paul R. Michl
Attorney, Agent, or Firm—J. Y. Clowney

[57] ABSTRACT

There is disclosed copolymers of 2,3-dimethyl-1,3-butadiene with butadiene or isoprene in which the 2,3-dimethyl-1,3-butadiene content ranges from about 20 to about 80 mole percent, characterized in that the microstructure of the 2,3-dimethyl-1,3-butadiene segments range from about 55 to about 65 percent trans-1,4. Also disclosed are copolymers of 2,3-dimethyl-1,3-butadiene with butadiene or isoprene in which the 2,3-dimethyl-1,3-butadiene content ranges from about 20 to about 80 mole percent characterized in that the microstructure of the 2,3-dimethyl-1,3-butadiene segments range from about 40 to about 65 percent trans-1,4 and 1,2 content of said segments does not exceed 20 percent, said copolymers being prepared by bulk polymerization techniques.

5 Claims, No Drawings

RUBBERY COPOLYMERS OF 2,3-DIMETHYL 1,3-BUTADIENE

This is a continuation, of application Ser. No. 3835 filed Jan. 16, 1979, now abandoned, which is a continuation of Ser. No. 915,682, filed June 14, 1878, now abandoned; which is a continuation of Ser. No. 825,318, filed Aug. 17, 1977, now abandoned; which is a continuation of Ser. No. 778,125, filed Mar. 7, 1977, now abandoned.

This invention is directed to block copolymers of butadiene or styrene with 2,3-dimethyl-1,3-butadiene in which the microstructure of the polymer units resulting from the 2,3-dimethyl-1,3-butadiene is in the range which makes it amorphous but stress-crystallizable and ranges from about 55 to about 65 percent trans 1,4. It is also directed to rubbery copolymers of 2,3-dimethyl butadiene which have exceptionally broad glass transition temperatures (Tg).

Although the proportion of trans-1,4 structure is the most important variable defining amorphous but stress-crystallizable polymer, the proportion of 1,2 has also some effect. It appears that 1,2 units disrupt crystallinity more effectively than cis-1,4 units do. Therefore, a polymer with 64% trans-1,4, 12% 1,2 and 24% cis-1,4 is noticeably more amorphous than one with 65% trans-1,4, 3% 1,2 and 32% cis-1,4. Thus, some 1,2 structure is desirable although it should not exceed about 20% because of the extreme chain-stiffening effect of such structure.

It is known that rubbers having a broad range of low temperature properties are desirable in tire treads because they have a correspondingly broad range of temperatures at which they exhibit good skid resistance. It is thus desirable to use a rubber in the tire tread that will show these characteristics and at the same time exhibit the other desirable properties necessary for a tire tread.

A number of types of homopolymer of 2,3-dimethyl-1,3-butadiene have been made but none of these is fully satisfactory as the major rubber component in automobile tires because there is no mode of placement of 2,3-dimethyl-1,3-butadiene monomer units in polymer chains which allows flexibility below about $-25°$ C. This is the lower limit. Polymers which have 1,2 units, or cyclized units, have even high stiffening temperatures. Tires become hard and dangerously poor in traction as the tire temperatures fall near the stiffening temperature. On the other hand, 2,3-dimethyl-1,3-butadiene rubber (provided that it has little 1,2 or cyclized structure) gives tires excellent skid resistance on wet roads when the temperature is 10° C. or higher.

In order to use 2,3-dimethyl-1,3-butadiene in tires suitable for use in northern winters, it is necessary to use some method of diluting or compensating for the excessive chain-stiffening effect of 2,3-dimethyl-1,3-butadiene units. This can be done by blending the homopolymers with a larger proportion of at least one other rubber which has better low temperature properties, such as cis-1,4-polyisoprene or cis-1,4-polybutadiene. Or, it can be done by preparing random copolymers of 2,3-dimethyl-1,3-butadiene with other monomers such as butadiene or isoprene, for example, in aqueous emulsion with free radical initiation. A third way is by preparing block polymers with at least one other monomer such as isoprene or butadiene. The present invention is addressed to a particular type of block copolymer of 2,3-dimethyl-1,3-butadiene.

Crystallinity is a further characteristic of some polymers of 2,3-dimethyl-1,3-butadiene which leads to hardness and poor traction in tires. Polymers consisting almost entirely of cis-1,4(2,3-dimethyl-1,3-butadiene) units or almost entirely of trans-1,4(2,3-dimethyl-1,3-butadiene units are crystalline powders, as was shown by T. F. Yen (J. Polymer Sci. 35, p. 533 (1959) and J. Polymer Sci. 38, p. 272 (1959)). Even when the proportion of trans-1,4 units is about 70%, 2,3-dimethyl-1,3-butadiene polymers have an objectionable degree of crystallinity. Thus, when 2,3-dimethyl-1,3-butadiene was polymerized in aliphatic hydrocarbon with alkyl lithium initiation, crystalline polymers with 72–74% trans-1,4, 23–25% cis-1,4, and 3% 1,2 were made (D. Blondin, J. Regis, J. Prud'homme, Macromolecules 7, (2) p. 187–189 (1974)). On the other hand, when 2,3-dimethyl-1,3-butadiene was polymerized with free radical initiators, the proportion of trans-1,4 was 49–54%, cis-1,4 38–44%, 1,2 8% (D. Blondin et al, reference above). This is an amorphous rubber which would be suitable for tires except for the fact that it stiffens not much below 0° C.

The 2,3-dimethyl-1,3-butadiene polymers having high 1,2 content have also been made. For example, H. Yuki, Y. Okamoto and H. Takano, in Polymer Journal 2 (5) pp. 663–669 (1971), showed that polymerization in tetrahydrofuran at $-78°$ C. with n-butyl lithium produced an amorphous polymer with 86% 1,2. This polymer was resinous and not rubbery. It did not soften until the temperature was raised to 88°–97° C. Yuki et al showed also that mixtures of tetrahydrofuran with aliphatic solvents, with n-butyl lithium initiation, produced polymers with intermediate structure, down to 46% 1,2 using a tetrahydrofuran/lithium ratio of 2:1 molar at 30° C. in benzene. We have found that rubbery polymers can be made at 65° C. with molar ratio of tetrahydrofuran/lithium 0.7 in aliphatic solvents such as pentane or hexane. They have 58–67% trans-1,4, 27–28% cis-1,4, and 6–14% 1,2. It is particularly interesting that these rubbers, while amorphous like the free radical polymer referred to in the previous paragraph, differ from the free radical polymer in being very readily stress-crystallizable when stretched. This gives them the property commonly called green strength, advantageous for tire-building. This invention is directed to block copolymers in which the 2,3-dimethyl-1,3-butadiene microstructure is in the range which makes it amorphous but stress-crystallizable, i.e., about 55 to about 65% trans-1,4.

Therefore, according to the invention there are described copolymers of 2,3-dimethyl-1,3-butadiene and isoprene and copolymers of 2,3-dimethyl-1,3-butadiene and butadiene, in which the dimethylbutadiene segments have a range of microstructure in the range of about 55 to about 65% trans-1,4.

The range of microstructure required is one in which there is sufficient order for stress-crystallization to occur but too much disorder for the dimethylbutadiene segments to be crystalline at ambient temperature in the unstressed condition. Stress-crystallization is desirable because it imparts extra strength, but crystallinity in the unstressed condition is undesirable because it persists even in the cross-linked vulcanizates and makes then unduly hard and therefore more prone to skidding. The range 55% to 65% trans-1,4 (either in dimethylbutadiene homopolymers or in the dimethylbutadiene segments of block copolymers) is in the range comprising amorphous but stress-crystallizable polymers. More narrowly, the most preferred range is 60–65% trans-1,4. Outside the 55–65% range are free radical emulsion polymers of dimethylbutadiene, which have about 50% trans-1,4 and do not ordinarily undergo any crystallization even when stretched several hundred percent, especially in the presence of comonomers which tend to be distributed randomly among the dimethylbutadiene units and thus increase the disorder.

Furthermore, free radical emulsion copolymers are by the same token non-blocky, and exhibit only one relatively narrow Tg which is a weighted average of the Tg's of the corresponding homopolymers. Also usually outside the required range of dimethylbutadiene microstructure are solution block copolymers prepared in pure aliphatic solvents with lithium or alkyl lithium initiators. Such polymers have typically more than 65% trans-1,4 structure in the dimethylbutadiene segments and they ordinarily exhibit the hardness and high modulus of crystalline or semi-crystalline polymers.

The rubbery copolymers of this invention may be prepared in certain aromatic hydrocarbon solvents, such as benzene and particularly toluene, by mixing lithium or alkyl lithium initiators with monomer mixtures comprising either dimethylbutadiene and butadiene or dimethylbutadiene and isoprene, in said aromatic solvent, in an essentially batch process. Another way of preparing the copolymers of this invention is to carry out the polymerization in an aliphatic solvent in the presence of a modifying solvent or modifier in an appropriate molar ratio with respect to lithium in the initiator so as to produce trans-1,4 structure in the desired range of 55 to 65%, preferably 60–65%. The ratio of the modifier to Li must be chosen with respect to its structure and to the polymerization temperature. For example, tetrahydrofuran is suitable as a modifier in pentane at a ratio of 0.65 to 0.8 mole per gram atom of lithium at a temperature of 65° C.; and as another example, tetrahydrofuran is also suitable at a ratio of 0.5 to 0.6 mole per gram atom of lithium at a temperature of 50° C. On the other hand, tetramethylethylenediamine is a suitable modifier at a ratio of about 0.4 mole per gram atom of lithium at 65° C.; and diethyl ether is a much milder modifier, requiring a ratio of about 5 moles per gram atom of lithium at 50° C. in pentane.

Such modifiers also modify the structure of the non-dimethylbutadiene segments of the copolymer molecules. Moreover, it is well known that the characteristic combining proportions of the monomers (generally expressed as reactivity ratios) are different in the presence of such modifiers so that the copolymers are more randomized, less blocky. Because both of these effects are generally not desirable, i.e., it is not advantageous to change the polybutadiene or the polyisoprene microstructure, and also not advantageous to randomize the copolymerization; it is preferred to add the modifier only after the polymerization of a substantial proportion of the butadiene or isoprene has occurred.

Still another way of preparing the copolymers of this invention is to polymerize "in bulk", that is, to contact a mixture of dimethylbutadiene or a mixture of dimethylbutadiene and isoprene with lithium or alkyl lithium initiator in the absence of any solvent, other than the monomers themselves and the small amount of hydrocarbon which is used as a vehicle for the initiator. In this case, the proportion of dimethylbutadiene is preferably over 80% by weight for more convenient control of the heat generated by the polymerization of the other monomer. The proportion of dimethylbutadiene in the polymer can be controlled to less than its proportion in the monomer by terminating the reaction at less than 100% conversion and recycling the unconverted monomer if desired. It is also convenient to carry out the first stage of the polymerization (in which predominantly butadiene or isoprene polymerizes) at a temperature of 40° C. or less, then later to raise the temperature to about 50° C. (or eventually as high as 80° C.) to conduct the dimethylbutadiene polymerization at a more convenient rate.

The copolymers of 2,3-dimethyl-1,3-butadiene which are prepared by bulk polymerization techniques are suitable if the microstructure of the dimethylbutadiene segments range from 40 to 65 percent trans-1,4 and the 1,2 content does not exceed 20 percent.

Block copolymers with sharply defined segments (prepared for example, by excluding one monomer from the mixture until polymerization of the other monomer is essentially complete) are within the scope of this invention because they will exhibit more than one Tg and will have some advantages in their performance as tread rubber. However, preferred are the "tapered" or "graded" block polymers which result from contacting lithium containing initiators with mixture of dimethyl butadiene and either butadiene or isoprene as described above.

Whether the copolymers are made by polymerization in an aromatic solvent, in an aliphatic solvent with delayed addition or a modifier, or in bulk, the polymers are referred to as "tapered" block polymers or "graded" block polymers because each molecule has one terminal segment or block made up almost entirely of 2,3-dimethyl-1,3-butadiene units and the other terminal segment made up almost entirely of units of the other diene, which is either butadiene or isoprene. Between these relatively pure blocks is a central segment of gradually changing composition, made up of both 2,3-dimethyl-1,3-butadiene units and units of the other diene, either 1,3-butadiene or isoprene.

Although control of the trans-1,4 microstructure implies control also of the Tg, it is not necessary nor convenient to specify the Tg of the dimethylbutadiene segments precisely when describing copolymers of this invention. It is preferred, moreover, that the glass transition occur over an unusually large range of temperature. The Tg's of polydimethylbutadienes with either all trans-1,4 microstructure of all cis-1,4 microstructure have not been reported in the literature because such polymers are highly crystalline and do not clearly exhibit a glass transition. On the other hand, the transitions for these two varieties of structure are believed to be not far apart, and the evidence from various amorphous polymers of mixed structure indicates that the Tg dimethylbutadiene polymer with all 1,2 structure would approach 100° C. while the Tg's of all trans or all cis polymer would be about −25° C. In dimethylbutadiene homopolymers prepared by any of the three methods which we have described for copolymers of the present invention (but including only dimethylbutadiene monomer and omitting the other monomer), the Tg lies in the range +10° C. to −20° C. In the copolymers, it is probable that some segment has Tg in this range but with differential scanning calorimetric or differential thermal instruments, the glass transition is obscure or not even detectable. In instruments which measure torsonal modulus as a function of temperature, the transition from very high modulus to low modulus occurs gradually over a range, for example, a range of 70° C. In contrast, homopolymer or random copolymers exhibit what are described as sharp transitions with range of only 10° C. What is significant is that the preferred copolymers of this invention exhibit neither the sharp transition of the dimethylbutadiene homopolymer (centering somewhere in the range +10° C. to −20° C., when appropriate correction for the rate of the test is made) nor the sharp transition of the other homopolymer, which centers approximately at −95° C. in the case of polybutadiene and at −65° C. in the case of polyisoprene. Instead they exhibit a gradual transition inbetween the ranges where the Tg's of the homopolymers ordinarily lie, and they exhibit much attenuated transitional behavior in the homopolymer Tg ranges.

The proportions in which monomers are copolymerized to produce the copolymers of this invention are not critical. However, the most pronounced broadening of the glass transition occurs when the monomers are in approximately equal proportions. Also, in order to have the advantage of a broadened Tg, it is essential for each segment of the copolymer to be long enough to have some influence on Tg. For this reason, effective copolymers in this invention are confined to the range 20 to 80 mole percent dimethylbutadiene. Tapered block copolymer molecules with about 20 percent dimethylbutadiene have a relatively short segment which is predominantly dimethylbutadiene and therefore it is less important to suppress crystallinity in this short segment. It may be convenient to permit trans-1,4 microstructure to exceed the ordinarily preferred 60-65%. Accordingly, when the polymer is prepared in an aliphatic solvent, such as pentane or hexane, a lower level of modifier is possible. it is even possible, though not preferred, to omit the modifier altogether. On the other hand, in polymers which have about 80 mole percent DMB, the elimination of crystallinity is particularly important; trans-1,4 dimethylbutadiene microstructure should be controlled within the preferred range 60-65%. The range 50-55% is acceptable, and the range 65-70% is not acceptable unless the 1,2 content is 10% or more. It is evident from the above that control of microstructure has more or less importance depending on the monomer composition of the copolymers.

Polymers with 30-40 mole percent DMB (40-50 weight percent) and 60-70 mole percent (70-80 weight percent) are more reliable in Tg properties than the more extreme compositions and the trans-1,4 content is controlled according to principles which have been explained in an earlier paragraph. Preferred compositions are 40 to 60 mole percent dimethylbutadiene (50 to 70 weight percent) because it is easiest to produce broadened Tg's in this range. It is desirable to control trans-1,4 content as has been described.

Among monomers which can be polymerized under convenient conditions to useful high molecular weight rubbery polymer with lithium initiators, it has been found unexpectedly that dimethylbutadiene is unique in two ways. In the first place, when the polymers are prepared in industrially preferred pure hydrocarbon solvents, such as pentane, hexane, or cyclohexane, the dimethylbutadiene polymers have appreciable crystallinity which is not suppressed by vulcanization and therefore they are not useful in rubber applications. In the second place, the polymer's nature is unusually sensitive to slight changes in solvent. For example, in benzene or in toluene, the 1,2 microstructure increases by a factor of about four (1,2 increases from 3% in pentane to 12% in toluene) whereas in butadiene or isoprene the corresponding factor is barely greater than 1 (1,2 increases from 8% in pentane to 9% in toluene). It happens also that the change in DMB microstructure which accompanies the change in solvent from pentane to toluene is just enough to eliminate the crystallinity which occurs in the polymer at rest, without removing its ability to crystallize when stretched. Simply changing polymerization solvent from pentane to toluene makes the polymer unexpectedly useful as a rubber which, like Natural Rubber, has high green strength. In contrast, the lithium rubbers of isoprene, butadiene, ethylbutadiene, pentadiene and methylpentadiene, when made with lithium initiators under any conditions known to us are amorphous rubbers which do not ordinarily display any crystallinity, and have notably poor green strength compared to Natural Rubber. There is no particular difference in the polymers of these monomers attributable to aliphatic versus aromatic polymerization solvent, other than very minor changes in microstructure. Green strength, in particular, is not improved in aromatic solvent versus aliphatic.

Because toluene is for several reasons including environmental impact not preferred in industrial polymerization, we have considered other methods of producing the desired microstructure in aliphatic solvents. It happens, as described above, that the addition of modifiers, such as THF or glyme, can also change the dimethylbutadiene microstructure to a desired configuration and this constitutes our second method of making rubbery polydimethylbutadiene segments. Dimethylbutadiene is unique amongst the monomers mentioned in that the use of such modifiers changes the polymer properties in a direction such as to improve the stress-crystallizing behavior. Modifiers do not improve the stress-crystallization of the other polymers. They do improve dimethylbutadiene polymers because they remove the undesirable crystallinity and bring green strength down to a practical range.

The foregoing remarks on dimethylbutadiene lithium polymer properties as compared to other lithium polymer properties could apply equally well to homopolymers and blocky segments in copolymers. For a particular application (the treads of inflatable tires) we prefer the tapered block copolymers not only because of the broadened glass transition but also because dimethylbutadiene homopolymers have a Tg high enough to cause undesirable stiffening in northern winter temperatures if the polymer constitutes a substantial proportion of the tread rubber.

The practice of this invention is further illustrated by reference to the following examples which are intended to be representative rather than restrictive of the scope of the invention. Unless otherwise indicated, all parts and percentages are by weight.

EXAMPLE I

Butadiene (5.6 g) and dimethylbutadiene (37 g) were mixed with 2-Bu Li (·1 ml 1·27 M, in hexane) in a 125 ml screw-cap bottle under nitrogen. After 6 hours on a mechanical shaker at room temperature, the bottle was rotated 24 hours at 50° C. Polymerization was stopped by the addition of methanol (·3 g) and antioxidant (·1 g) in pentane (6 g). The polymer was isolated from the viscous solution by an equal volume of methanol containing 2 percent antioxidant by weight. After drying under reduced pressure at 50° C. the weight of polymer obtained was 16.3 g, 41 mole % butadiene and 59 mole % dimethylbutadiene by NMR. Inherent viscosity was 3.0 dl/g in toluene at 30° C. The product was a faintly blue translucent rubber with Shore A hardness below 30. Of the dimethylbutadiene units, 49% were trans-1,4, 43% cis-1,4, and 8% 1,2 by a proton NMR 300 MHZ method in which the precision is ±1 to 2 percentage units absolute.

EXAMPLE II

Isoprene (1580 g) and dimethylbutadiene (1710 g) were mixed in pentane (8680 g) in a stirred reactor under dry nitrogen. The temperature was raised to 50° C. and 2-butyllithium (23 ml 1.06 molar solution in hexane) was added. Stirring was continued for 35 hours, when the polymerization was stopped by the addition of a solution of methanol (80 g) and antioxidants (40 g) in benzene (500 g) to the viscous polymer solution. The polymer was separated by coagulation in excess methanol containing 1% antioxidant, and dried at reduced pressure at 40° C. The recovered dry polymer was 2874 g, inherent viscosity 1.0 dl/g in benzene at 30° C., estimated composition 53 mole percent isoprene, 47 mole percent dimethylbutadiene, of which 65% were trans-1,4, 32% cis-1,4, and 8% 1,2, by the NMR method of Example I. The copolymer of this example has an exceptionally broad glass transition. However, this composition is not preferred, because the crystallinity of the dimethylbutadiene segment is sufficient to raise the modulus undesirably high.

EXAMPLE III

Butadiene (11 pounds) and dimethylbutadiene (17 pounds) were mixed in hexane (85 pounds) in a stirred reactor under nitrogen. After the addition of 2-butyllithium (84 mmoles) the temperature was maintained at 30° C. for almost two hours. At 2 hours the total solids concentration was 10%. At that time tetrahydrofuran (36 mmoles) was added and the temperature raised to 65° C. After a total time of 20 hours the reaction was stopped by the addition of methanol (57 g). Antioxidants (171 g) were added and the polymer (23 pounds) was isolated by steam-stripping, dewatering and drying. Its composition was 56 mole percent dimethylbutadiene of which 64% was trans-1,4, 24% cis-1,4, and 12% 1,2 by the NMR method of Example I.

EXAMPLE IV

Isoprene (1120 g) and dimethylbutadiene (1340 g) were mixed in toluene (9830 g) in a stirred reactor under nitrogen. The temperature was raised to 50° C. and 2-butyllithium (14 ml, 1,27 molar solution in hexane) was added. After 4 hours at 50° C., the temperature was raised to 80° C. for 17 hours. The polymerization was stopped by the addition of a solution of methanol (80 g) and antioxidants (40 g) in benzene (500 g) to the viscous polymer solution. The polymer was separated by coagulation in excess methanol containing 1% antioxidant, and dried at reduced pressure at 40° C. The recovered dry polymer was 2870 g, inherent viscosity 1.6 3 1/g in benzene at 30° C., composition 60 mole percent isoprene and 40 mole percent dimethylbutadiene, of which 62% of the units were trans-1,4, 29% cis-1,4, and 9% 1,2, by the NMR method of Example I.

EXAMPLE V

Butadiene (650 g) and dimethylbutadiene (1560 g) were mixed in toluene (8550 g) in a stirred reactor under nitrogen. The temperature was raised to 50° C. and 2-butyllithium (25 ml 1.27 molar solution in hexane) was added. After 2 hours at 50° C. the temperature was raised to 80° C. for 14 hours. The recovered dry polymer was 1400 g., inherent viscosity 1.9 dl/g in benzene at 30° C., composition 52 mole percent butadiene, 48 mole percent dimethylbutadiene, of which 59% was trans-1,4, 31% cis-1,4 and 10% 1,2, by the NMR method of Example I.

The examples illustrate preparation of tapered block copolymers of 2,3-dimethyl-1,3-butadiene using alkyllithium initiation. Example I shows polymerization in bulk, essentially without solvent other than the monomers themselves. Example II is a isoprene-dimethylbutadiene in pentane without any modifier, and consequently with too much crystallinity in the polymer. Example III shows butadiene-dimethylbutadiene in hexane with modifier added after most of the butadiene had polymerized. This polymer is a satisfactory rubber. Example IV shows isoprene-dimethylbutadiene polymerized in toluene. Because of the influence of this solvent on microstructure, the polymer was a satisfactory rubber without the need of a modifier. Similarly, Example V shows polymerization of butadiene-dimethylbutadiene in toluene.

While certain representative embodiments and details have been shown for the purpose of illustrating the invention, it will be apparent to those skilled in this art that various changes and modifications may be made therein without departing from the spirit or scope of the invention.

What is claimed is:

1. Stress crystallizable tapered block copolymers of 2,3-dimethyl-1,3-butadiene and butadiene or isoprene in which the 2,3-dimethyl-1,3-butadiene content ranges from about 20 to about 80 mole percent, characterized in that the said tapered block copolymers have one terminal segment of the block made up almost entirely of 2,3-dimethyl-1,3-butadiene units and the other terminal segment made up almost entirely of units of the other diene, either butadiene or isoprene, between these relatively pure terminal blocks is a central segment of gradually changing composition made up of both 2,3-dimethyl-1,3-butadiene units and units of the other diene, 1,3-butadiene or isoprene, said copolymers being further characterized in that the microstructure of the 2,3-dimethyl-1,3-butadiene segments range from about 55 to about 65 percent trans-1,4 and does not exceed about 20 percent 1,2-microstructure.

2. Tapered block copolymers according to claim 1 in which the 2,3-dimethyl-1,3-butadiene content ranges from about 20 to about 50 mole percent.

3. Tapered block copolymers according to claim 1 in which the 2,3-dimethyl-1,3-butadiene content ranges from about 60 to about 80 mole percent.

4. Tapered block copolymers according to claim 1 which are prepared by bulk polymerization techniques.

5. Tapered block copolymers according to claim 1 in which the 1,2 content of the 2,3-dimethyl-1,3-butadiene segments is at least 5 percent 1,2 microstructure.

* * * * *